3,145,783
WATER-WELL SCREEN DRIVE POINT
David L. Sibley, 1120 Walnut St., Newport, Ark.
Filed Dec. 24, 1962, Ser. No. 246,786
8 Claims. (Cl. 175—19)

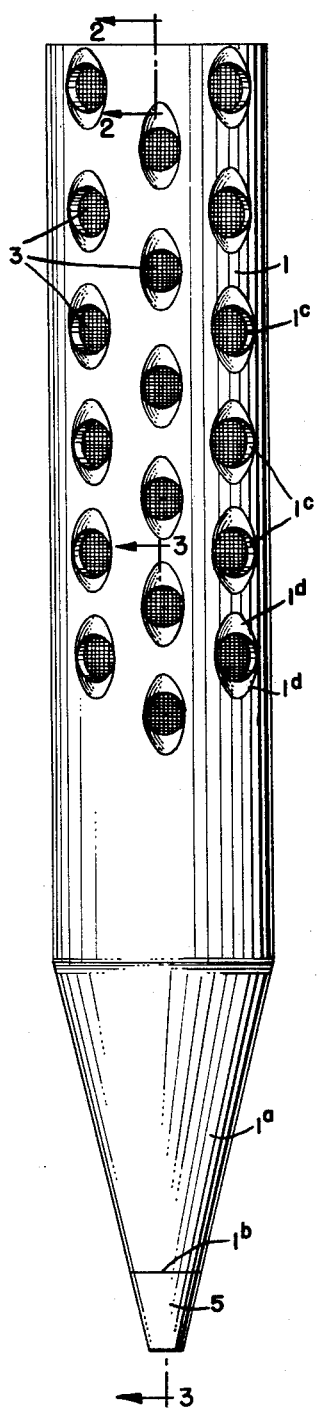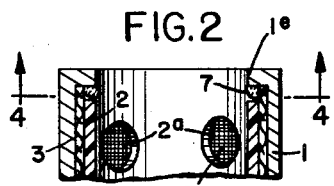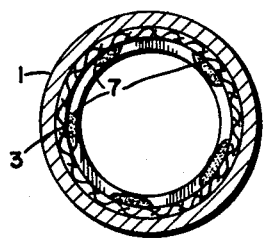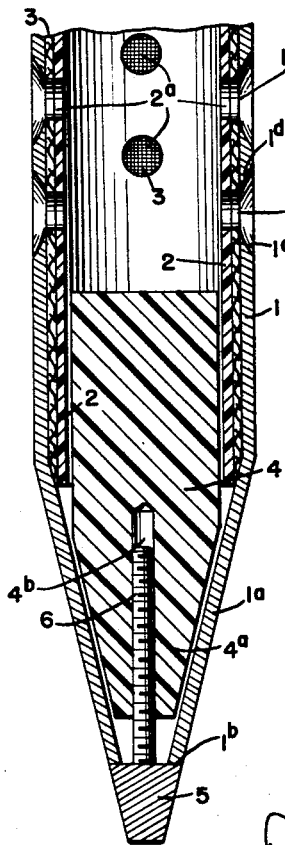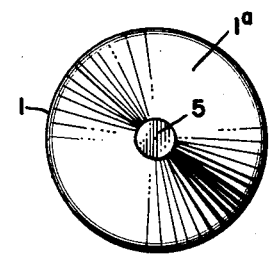

This invention relates to water-well screen drive-points for use in drilling wells for water or the like, whereby the securing of water in rural or like areas may be made more readily and economically; and the principal object of the invention is to provide a novel drive-point embodying certain novel features of construction hereinafter set forth, whereby in the production of my drive-point much different work heretofore necessitated is eliminated, and wherein soldering is practically eliminated, and wherein material costs are lowered, the production of my points lending itself to fast production and automation.

A further object of the invention is to provide a well point of the above type which will provide better cleaning action during driving, and will combat the compaction of gumbo soils during driving.

Other minor objects of the invention will be hereinafter set forth.

I will explain the invention with reference to the accompanying drawing, which illustrates one practical embodiment thereof to enable others familiar with the art to adopt and use the same, and will summarize in the claims the novel features of construction and novel combinations of parts, for which protection is desired.

In said drawings:

FIG. 1 is a vertical elevational view of my novel water-well screen drive-point.

FIG. 2 is a section on the line 2—2, FIG. 1.

FIG. 3 is a vertical section on the line 3—3, FIG. 1.

FIG. 4 is a horizontal section on the line 4—4, FIG. 2.

FIG. 5 is a bottom plan view of the drive-point shown in FIG. 1.

As shown in the drawing, my novel water-well screen drive-point comprises an outer tube 1 of steel or other rigid material, the diameter of which may be of various sizes, the lower end of the tube 1 being conically rolled as at 1a substantially to a point, the point, however, being truncated as at 1b so as to leave a small axial circular opening at said lower end. The length of tube 1 may be as desired to suit the particular conditions or requirements of the drilling operation.

In the tubular portion of the tube, above the rolled conical portion 1a, are a series of vertically or axially extending rows of perforations 1c which are of desired internal diameter, but the top and bottom walls of the openings 1c at the outer face of the tube 1 are tapered as as 1d so that the outer wall of the tube adjacent the holes 1c are elongated in a vertical or axial direction, the outer ends of the holes 1c being substantially elliptical while the inner ends of the holes are substantially circular. By so tapering the holes 1c a better cleaning action of the drive-point is secured during the driving of the well point, and also the taper of the holes 1c combats compaction of gumbo soils in driving. Any desired arrangement of the holes 1c or series of holes may be made.

Within the tube 1 is an inner plastic tube or pipe 2 extending from the top of the tube 1 to a point adjacent the shoulder of tube 1 formed by the conically roller portion 1a, said pipe 2 being formed of plastic as above stated, and having holes 2a therein of circular shape adapted to register with the holes 1c in the tube 1.

Plastic tube 2 is of slightly smaller external diameter than the internal diameter of tube 1, and disposed between the tubes 1 and 2 throughout the length of the tube 2 is a screen 3 closely fitting the outside of the tube 2 and adapted to contact the inner wall of the tube 1.

In the lower end of the tube 2 below the lowermost holes 2a is a plastic plug 4 which as shown is of cylindrical shape having its lower end 4a conically formed to conform with the shape of the lower conical end of the tube 1, said plug 4 having a vertical bore 4b extending upwardly from its lower end as shown in FIG. 3, the lower end of the plug 4 terminating above the lower end of the tube 1.

At the lower end of the conical portion 1a of tube 1 is a detachable point 5 which may comprise the conical head of a screw 6, which screw engages the walls of the bore 4b of the plastic plug 4, as shown in FIG. 3.

When the parts have been assembled as shown in FIG. 3, the upper end of the tube 1 may be inturned as at 1e, FIG. 2, to form an internal shoulder disposed above the top of the plastic inner tube 2, and a steel ring 7, FIGS. 2 and 4, is then soldered into the recess between the flange 1e and the top of tube 2 so as to securely lock the inner tube 2 and screen 3 in their proper positions within the tube 1.

One of the main features of my well point is economy and quality, economy being secured in conically rolling the portion 1a of tube 1 which is rendered possible because of the fact that the screen 3 is disposed on the inside of the tube 1 and no external shoulder on the tube 1 is required to hold an external screen in place.

The use of plastic plug 4 renders the same highly resistant to corrosion. The use of the internal screen 3 within tube 1 makes slippage of the screen 3 highly improbable, since the screen is placed and secured between the inner and outer tubes as shown in FIG. 3. Thus the major portion of the screen except through the holes in the tubes is protected from rocks and debris. If desired, the screen 3 can be made of stainless steel for the prevention of electrolysis.

In use, if the well-point should crack or split, the internal parts thereof would still be completely sealed and remain intact. Tests on the well-point have shown that such splitting or cracking does not happen under ordinary conditions. By reason of the tapering of the outer ends or walls of the holes 1c of tube 1, if corrosion should build up on the outside of the point a slight driving action of the tube 1 will clear the holes 1c of such corrosion, rendering the well drive-point ready for further service provided the point is still in the water strata.

According to my invention, the closeness of the inner screen 3 to the wall of the outer tube 1 gives a much greater collapsing strength to the screen 3. Moreover, the inner plastic tube 2 gives lowest friction loss and best water protection against undesirable build-ups of lime deposits and corrosion.

In assembling my novel water-well screen drive-point I first drill and taper the holes 1c in the tube 1 and then stretch and roll the outer tube 1 to provide the conical portion 1s while the tube is heated. The inner plastic tube 2 is then drilled with holes 2a to match the holes 1c in the outer tube, and the inner tube 2 then covered externally with the screen 3 and then the plastic plug 4 is cemented to the end of the inner tube 2. The assembly of tube 2 with screen 3 and plug 4 is then inserted in the tube 1. It is of course necessary in inserting the inner tube 2 that the holes 2a therein coincide with the holes 1c in the outer tube 1.

The assembly of tubes is then expanded while the assembly is immersed in hot water, preferably using a pneumatic rubber hose, and then cooled while still under air pressure. The detachable point 5 is then screwed in place into plug 4 so that downward pressure locks the screw 6 in place in bore 4b to prevent any quicksand from slipping the screen 3 upwardly during the driving operation. The steel ring 7 is then soldered in place between the top of the tubes 1 and 2 providing for further protection against disassembly of the parts due to upward pressure. If desired, the upper end of the outer tube 1 may then be threaded (not shown).

I do not limit my invention to the exact form shown in the drawing, for obviously changes may be made therein within the scope of the claims.

I claim:

1. A water-well screen drive-point comprising an outer tube having its lower portion conically shaped to provide a relatively small axial circular opening at its lower end, and having series of spaced holes in its upper portion; an inner tube within the outer tube and extending from the upper portion of the outer tube to the conically shaped portion, said inner tube having another series of spaced holes therein registering with those of the outer tube; a screen closely fitting the exterior of the inner tube and contacting the inner wall of the outer tube; a plug of cylindrical shape fitted within the lower end of the inner tube and having its lower end portion conically formed to conform with the conical portion of the outer tube and terminating above the circular opening, said plug having an axial bore therein extending upwardly from its lower end; a detachable point member having a conical head forming a continuation of the conical portion of the outer tube and having a threaded shank engaging the walls of the bore in the plug; and means for locking the inner tube within the outer tube.

2. In a drive-point as set forth in claim 1, said means comprising an internal annular flange at the upper end of the outer tube above the inner tube; and a ring secured in the outer tube between the flange and inner tube.

3. A water-well screen drive-point comprising an outer tube having its lower portion conically shaped to provide a relatively small axial circular opening at its lower end, and having series of spaced holes in its upper portion, the walls of said holes at the outer face of the tube being of self-cleaning contour; an inner tube within the outer tube and extending from the upper portion of the outer tube to the conically shaped portion, said inner tube having another series of spaced holes therein registering with those of the outer tube; a screen closely fitting the exterior of the inner tube and contacting the inner wall of the outer tube; a plug of cylindrical shape fitted within the lower end of the inner tube and having its lower end portion conically formed to conform with the conical portion of the outer tube and terminating above the circular opening, said plug having an axial bore therein extending upwardly from its lower end; a detachable point member having a conical head forming a continuation of the conical portion of the outer tube and having a threaded shank engaging the walls of the bore in the plug; and means for confining the inner tube within the outer tube.

4. In a drive-point as set forth in claim 3, said holes in the outer tube being circular at the inner wall of the tube, and the walls thereof being tapered at the outer wall of the tube so as to be elongated axially of the tube into substantially elliptical shape to prevent accumulation and compaction of soil and corrosion in said holes during driving of the point.

5. In a drive-point as set forth in claim 3, said means comprising an internal annular flange at the upper end of the outer tube above the inner tube; and a ring secured in the outer tube between the flange and inner tube.

6. A water-well screen drive-point comprising an outer tube having its lower portion conically shaped to provide a relatively small axial circular opening at its lower end, and having series of spaced holes in its upper portion, the walls of said holes at the outer face of the tube being of self-cleaning contour; an inner plastic tube within the outer tube and extending from the upper portion of the outer tube to the conically shaped portion, said inner tube having another series of spaced holes therein registering with those of the outer tube; a screen closely fitting the exterior of the inner tube and contacting the inner wall of the outer tube; a plastic plug of cylindrical shape fitted within the lower end of the inner tube and having its lower end portion conically formed to conform with the conical portion of the outer tube and terminating above the circular opening, said plug having an axial bore therein extending upwardly from its lower end; a detachable point member having a conical head forming a continuation of the conical portion of the outer tube and having a threaded shank engaging the walls of the bore in the plug; and means for confining the inner tube within the outer tube.

7. In a drive-point as set forth in claim 6, said holes in the outer tube being circular at the inner wall of the tube, and the walls thereof being tapered at the outer wall of the tube so as to be elongated axially of the tube into substantially elliptical shape to prevent accumulation and compaction of soil and corrosion in said holes during driving of the point.

8. In a drive-point as set forth in claim 6, said means comprising an internal annular flange at the upper end of the outer tube above the inner tube; and a ring secured in the outer tube between the flange and inner tube.

References Cited in the file of this patent

UNITED STATES PATENTS

| | | |
|---|---|---|
| 717,420 | Leeson | Dec. 30, 1902 |
| 945,490 | Decker | Jan. 4, 1910 |
| 2,627,315 | Hettinger | Feb. 3, 1953 |